(12) United States Patent
Park et al.

(10) Patent No.: US 10,183,589 B2
(45) Date of Patent: Jan. 22, 2019

(54) POWER CONTROL SYSTEM AND POWER CONTROL METHOD FOR GREEN VEHICLE

(71) Applicant: Hyundai Motor Company, Seoul (KR)

(72) Inventors: Sung Hwan Park, Gyeonggi-do (KR); Jun Yeon Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 188 days.

(21) Appl. No.: 15/248,108

(22) Filed: Aug. 26, 2016

(65) Prior Publication Data
US 2017/0267119 A1 Sep. 21, 2017

(30) Foreign Application Priority Data

Mar. 15, 2016 (KR) .................. 10-2016-0031094

(51) Int. Cl.
B60L 11/18 (2006.01)
H02J 7/00 (2006.01)

(52) U.S. Cl.
CPC ....... B60L 11/1861 (2013.01); B60L 11/1868 (2013.01); B60L 2240/12 (2013.01); B60L 2240/68 (2013.01); B60L 2260/26 (2013.01); B60L 2260/52 (2013.01); B60L 2260/54 (2013.01); Y02T 10/7005 (2013.01); Y02T 10/7044 (2013.01); Y02T 10/7066 (2013.01); Y02T 10/7291 (2013.01); Y02T 90/16 (2013.01); Y02T 90/161 (2013.01)

(58) Field of Classification Search
CPC .............. B60L 11/1864; B60L 11/1809; B60L 11/1861; B60L 2240/68; B60L 2260/52; B60L 2260/54; B60L 2260/26; H02J 7/0068
See application file for complete search history.

(56) References Cited

U.S. PATENT DOCUMENTS

2016/0280203 A1* 9/2016 Yang .................... B60W 10/06

FOREIGN PATENT DOCUMENTS

| JP | 2012-244784 A | 12/2012 |
| KR | 10-2006-0000647 A | 1/2006 |
| KR | 10-2009-0059175 A | 6/2009 |
| KR | 10-1180801 B1 | 9/2012 |
| KR | 10-1459485 B1 | 11/2014 |

OTHER PUBLICATIONS

Machine Translation KR 10-1459485 published Nov. 2014 (Year: 2014).*

* cited by examiner

Primary Examiner — Anne M Antonucci
(74) Attorney, Agent, or Firm — Mintz Levin Cohn Ferris Glovsky and Popeo, P.C.; Peter F. Corless

(57) ABSTRACT

In a power control system for a green vehicle, whether a congested zone is present ahead is recognized using traffic information. When the congested zone is present, a remaining capacity of a main battery is recognized, and a required power amount required for passing through the congested zone is calculated. When the green vehicle reaches a power control point for the required power amount, charging of an auxiliary battery is stopped from the power control point to a start point of the congested zone, and the main battery is charged in a concentrated manner. When the green vehicle reaches the start point of the congested zone, the green vehicle is driven with power of the main battery. When the green vehicle reaches an end point of the congested zone, the auxiliary battery is charged.

13 Claims, 6 Drawing Sheets

POWER CONTROL SYSTEM AND POWER CONTROL METHOD FOR GREEN VEHICLE

CROSS-REFERENCE TO RELATED APPLICATION

This application claims under 35 U.S.C. § 119(a) the benefit of Korean Patent Application No. 10-2016-0031094 filed in the Korean Intellectual Property Office on Mar. 15, 2016, the entire contents of which are incorporated herein by reference.

BACKGROUND (a) Technical Field

The present invention relates to a system and method for controlling charging and discharging of a main battery and an auxiliary battery using traffic information in a hybrid or electric vehicle.

(b) Description of the Related Art

A green vehicle (or an environmentally-friendly vehicle) such as a hybrid electric vehicle (HEV) or an electric vehicle (EV) has a main battery for driving a motor and an auxiliary battery for supplying power to an electronic/electric device (for example, a headlamp, a dome light, or a navigation device) within the green vehicle.

While the green vehicle is driving, the main battery and the auxiliary battery are repeatedly charged and discharged, and when charging is performed, one of the main battery and the auxiliary battery is charged. In the green vehicle, however, the main battery may not be sufficiently charged according to the charge conditions, that is, performance of the main battery may not be secured, in some cases, leading to a problem of driving performance. For example, if the green vehicle is placed in a congested zone and a charged state of the main battery is not sufficient, the main battery may be completely discharged in the congested zone, potentially making it impossible for the vehicle to drive.

The above information disclosed in this Background zone is only for enhancement of understanding of the background of the invention and therefore it may contain information that does not form the prior art that is already known in this country to a person of ordinary skill in the art.

SUMMARY

The present invention provides a power control system and a power control method for a green vehicle, having advantages of performing power control to stop charging an auxiliary battery and concentrate on charging a main battery according to driving environments.

The present invention provides a power control system and a power control method for a green vehicle, having advantages of performing power control on a main battery and an auxiliary battery when a congested zone is encountered in front of a vehicle such that the vehicle may pass through the congested zone, based on the main battery with sufficient performance.

An exemplary embodiment of the present invention provides a power control system for a green vehicle, including: a main battery configured to provide charged power to a motor to handle driving of the green vehicle; an auxiliary battery configured to handle power supply to an electronic/electric device within the green vehicle; a location recognizing unit configured to recognize a current location of the green vehicle; a congested zone recognizing unit configured to recognize whether a congested zone is present ahead using traffic information (e.g., received via a central server), and recognize information of the congested zone when the congested zone is present; a remaining battery capacity measuring unit configured to measure a remaining capacity of each of the main battery and the auxiliary battery; a control point calculating unit configured to calculate a power control point within an uncongested zone using information of the congested zone and the remaining capacity of the main battery when it is recognized by the congested zone recognizing unit that the congested zone is present ahead; a control unit configured to generally control each component, recognize a current location of the green vehicle through the location recognizing unit, perform control to charge and discharge the auxiliary battery and the main battery when the green vehicle is currently located in the uncongested zone, perform control to stop charging the auxiliary battery and concentratedly charge the main battery from the power control point to a start point of the congested zone when the green vehicle reaches the power control point, and perform charging on the auxiliary battery when the green vehicle enters the uncongested zone after having passed through the congested zone; a charging/discharging unit configured to perform charging or discharging on the main battery and the auxiliary battery; and a charging/discharging controller configured to control an operation of the charging/discharging unit under the control of the control unit.

The congested zone may be a zone in which an average driving speed of vehicles is lower than a control threshold speed at which charging the main battery and driving the vehicle are simultaneously performed, or a zone in which driving speeds of vehicles are lower than the lowest speed at which charging the main battery and driving the vehicle are simultaneously performed.

The control point calculating unit may calculate a required power amount required for passing through the congested zone using the information of the congested zone, calculates a required charge power amount required to be charged by comparing the remaining capacity of the main battery measured by the remaining battery capacity measuring unit with the required power amount, and calculate a charge driving distance required for charging the required charge power amount to calculate the power control point.

When the green vehicle reaches the power control point, the control unit may control the green vehicle to have a speed equal to or higher than a set speed. The power control point may be replaced with a power control time point so as to be utilized.

The congested zone recognizing unit may recognize a first point of inflection at which the speed of the vehicle is dropped to below the control threshold speed, recognize a second point of inflection at which the speed of the vehicle is changed to be equal to or higher than the control threshold speed, and recognize a zone from the first point of inflection to the second point of inflection, as the congested zone, on the basis of the traffic information.

When the central server or a traffic information receiving device has a function of calculating the power control point using traffic information, the control point calculating unit may be omitted from the components of the power control system.

Another exemplary embodiment of the present invention provides a power control method for a green vehicle, including: receiving front traffic information; recognizing whether a congested zone is present ahead using the front traffic information; when the congested zone is present, recognizing a remaining capacity of a main battery; calculating a required power amount required for passing through the congested zone, and calculating a required charge power amount corresponding to a difference between the remaining capacity of the main battery and the required power amount and a power control point for the required charge power amount; when the green vehicle reaches the power control point, stopping charging the auxiliary battery from the power control point to a start point of the congested zone and concentratedly charging the main battery; when the green vehicle reaches the start point of the congested zone, driving the green vehicle with power of the main battery; and when the green vehicle reaches an end point of the congested zone, charging an auxiliary battery.

In the concentrated charging of the main battery, when the green vehicle reaches the power control point, the green vehicle may be controlled to have a speed equal to or higher than a set speed.

In the recognizing of whether a congested zone is present ahead, a first point of inflection at which the speed of the vehicle is dropped to below the control threshold speed is recognized, a second point of inflection at which the speed of the vehicle is changed to be equal to or higher than the control threshold speed is recognized, and a zone from the first point of inflection to the second point of inflection is recognized as the congested zone, on the basis of the traffic information.

When the congested zone is a zone in which the average driving speed of the vehicles is lower than the control threshold speed at which charging the main battery and driving the green vehicle are simultaneously performed, the concentrated charging of the main battery may include: recognizing whether the green vehicle enters the congested zone; determining whether a current speed of the green vehicle is equal to or higher than the control threshold speed; when the current speed of the green vehicle is equal to or higher than the control threshold speed, determining whether the remaining capacity of the main battery is equal to or greater than the required power amount; and when the remaining capacity of the main battery is equal to or greater than the required power amount, charging the auxiliary battery.

A non-transitory computer readable medium containing program instructions executed by a processor can include: program instructions that receive front traffic information; program instructions that recognize whether a congested zone is present ahead using the front traffic information; program instructions that, when the congested zone is present, recognize a remaining capacity of a main battery; program instructions that calculate a required power amount required for passing through the congested zone, and calculate a required charge power amount corresponding to a difference between the remaining capacity of the main battery and the required power amount and a power control point for the required charge power amount; program instructions that, when a green vehicle reaches the power control point, stop charging the auxiliary battery from the power control point to a start point of the congested zone and concentratedly charge the main battery; program instructions that, when the green vehicle reaches the start point of the congested zone, drive the green vehicle with power of the main battery; and program instructions that, when the green vehicle reaches an end point of the congested zone, charge an auxiliary battery.

According to an exemplary embodiment of the present invention, power controlling is performed such that charging the auxiliary battery is stopped and the main battery is concentratedly charged according to driving environments, whereby occurrence of a situation in which it is impossible to drive a vehicle can be prevented in advance.

DETAILED DESCRIPTION OF THE EMBODIMENTS

Figure 1:
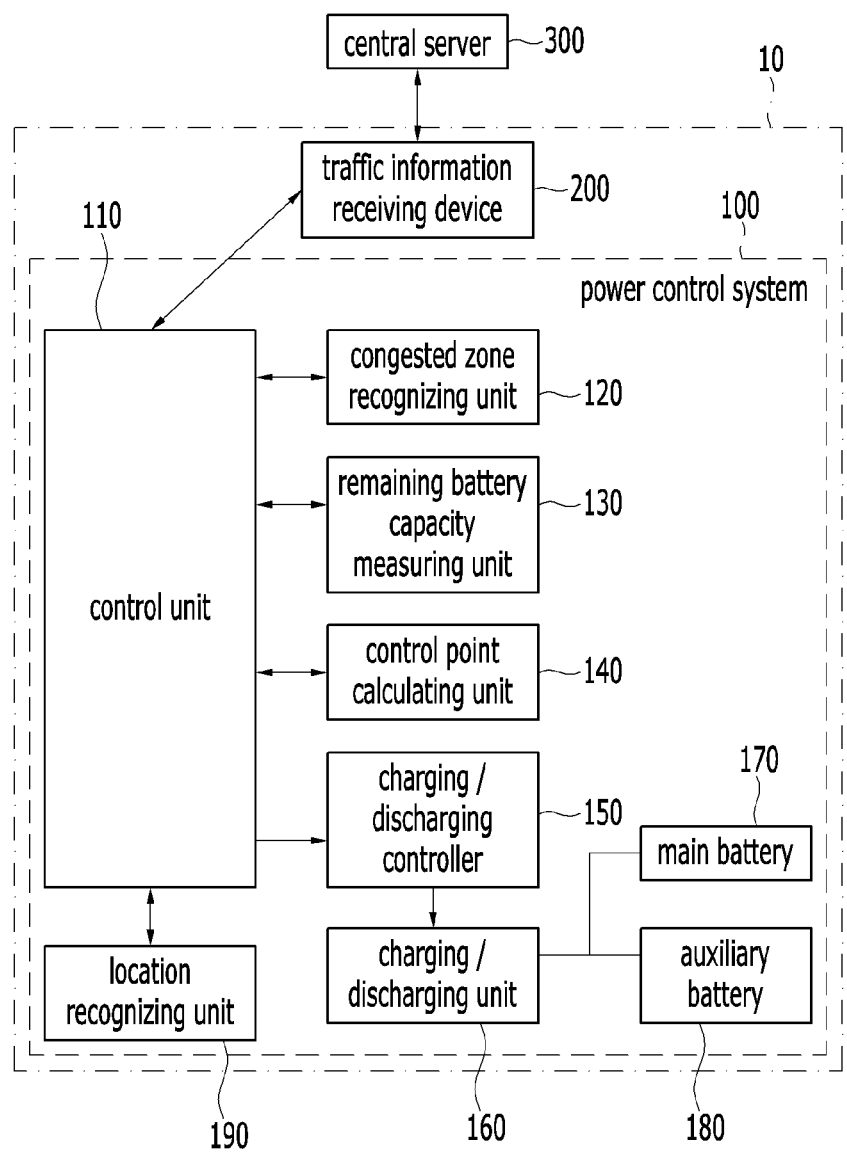
FIG. 1 is a block diagram illustrating a power control system for a green vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings so that a person skilled in the art to which the present invention pertains to easily implement the invention. As those skilled in the art would realize, the described embodiments may be modified in various different ways, all without departing from the spirit or scope of the present invention. In order to clearly describe the present invention, a portion irrelevant to a description of the present invention will be omitted, and like reference numerals refer to like elements throughout. Also, detailed descriptions of a known art will be omitted.

Hereinafter, a power control system and a power control method for a green vehicle according to exemplary embodiments of the present invention will be described with reference to the accompanying drawings.

FIG. 1 is a block diagram illustrating a power control system for a green vehicle according to an exemplary embodiment of the present invention. As shown in FIG. 1, a power control system 100 of a green vehicle 10 according to an exemplary embodiment of the present invention is linked wirelessly or by a wired connection to a traffic information receiving device 200 to receive traffic information in front of the green vehicle 10 from the traffic information receiving device 200, and controls charging and discharging of a main battery 170 and an auxiliary battery 180 corresponding to a traffic situation in front of the green vehicle 10 on the basis of the traffic information.

The traffic information receiving device 200 performs data communication with a central server 300 to receive traffic information in front of the green vehicle 10 from the central server 300 and provides the received traffic information to the power control device 100. For example, the traffic information receiving device 200 is a navigation device installed within the green vehicle 10 or a mobile device (i.e., a smartphone, a notebook computer, a tablet PC, or a netbook) carried along by a driver.

In particular, the power control system 100 includes a control unit 110, a congested zone recognizing unit 120, a remaining battery capacity measuring unit 130, a control point calculating unit 140, a charging/discharging controller 150, a charging/discharging unit 160, a main battery 170, an auxiliary battery 180, and a location recognizing unit 190. A wired or wireless communication module for a communication interface with the traffic information receiving device 200 is generally known, and thus further description of the traffic information receiving device 200 will be omitted. Also, illustration and descriptions of a memory unit storing various types of information will be omitted.

The control unit 110 may be a unit (i.e., a hybrid control unit, or the like) controlling a general operation of the green vehicle 10 or a control unit separately provided to control an operation of the power control system 100.

The congested zone recognizing unit 120 recognizes whether there is a congested zone in front of the vehicle using the traffic information provided from the traffic information receiving device 200, and when a congested zone is present, the congested zone recognizing unit 120 recognizes information of the congested zone. The information of the congested zone may be road identification information (ID), a start point of the congested zone of a corresponding road, an end point of the congested zone, and a total length of the congested zone obtained through the start point and the end point, and an average driving speed of the congested zone. Also, the information of the congested zone may further include an average driving speed of the vehicle by locations and a stop point of the vehicle.

The remaining battery capacity measuring unit 130 measures a state of charge (SOC) of each of the main battery 170 and the auxiliary battery 180.

As used herein, the congested zone is defined as a zone in which an average driving speed of vehicles is lower than the lowest speed (hereinafter, referred to as a "control threshold speed") at which charging the main battery 170 and driving the vehicle are simultaneously performed. Also, the congested zone is defined as a zone in which driving speeds of vehicles are lower than the lowest speed at which charging the main battery 170 and driving the vehicle are simultaneously performed.

The definition of the congested zone based on the average driving speed refers to the presence of a situation in which charging of the main battery 170 and driving of the vehicle are simultaneously performed in the congested zone, and the definition of the congested zone based on driving speeds refers to the absence of a situation in which charging of the main battery 170 and driving of the vehicle are simultaneously performed in the congested zone.

The control point calculating unit 140 calculates a power control point P1 in a case in which a congested zone is present in front of the vehicle. The power control point P1 is a point ahead of the congested zone, at which charging of the auxiliary battery 180 is stopped and the main battery 170 starts to be concentratedly charged.

The power control point P1 is dependent upon an amount of power of the main battery required for the vehicle to pass through the congested zone only with the power of the battery (hereinafter, referred to as "required power amount"), and relates to a current remaining capacity of the main battery. In particular, the required power amount is increased as a time required for passing through the congested zone lengthens, and decreased as a time for passing through the congested zone shortens. The time required for passing through the congested zone is in inverse proportion to a length (or distance) L2 of the congested zone and in proportion to an average driving speed V1 at the congested zone.

Thus, the control point calculating unit 140 calculates a required power amount using the information of the congested zone recognized by the congested zone recognizing unit 120, and calculates insufficient power, that is, a power amount required to be charged (hereinafter, referred to as "required charge power amount"), by comparing the current remaining capacity of the main battery 170 measured by the remaining battery capacity measuring unit 130 with the required power amount. Also, the control point calculating unit 140 calculates a driving distance (hereinafter, referred to as a "charge driving distance") required for charging the required charge power amount.

A driving speed of the green vehicle 10 acts as a variable in charging the main battery 170. For example, a large amount of power is generated at a high driving speed to make a charge speed faster, and a small amount of power is generated at a low driving speed, making a charge speed slower. In calculating the charge driving distance, the control point calculating unit 140 calculates the charge driving distance with respect to the current driving speed, a driving speed based on profile information including a driving pattern of a driver, or a set driving speed. In a case in which the set driving speed is used as a reference, the control point calculating unit 140 informs or instructs the driver to drive at a speed higher than the set driving speed through the control unit 110.

When the charge driving distance is calculated, a point from the start point of the congested zone to the charge driving distance in a direction toward the green vehicle 10 is the power control point P1, and the control point calculating unit 140 stores position coordinates of the power control point P1 or provides the same to the location recognizing unit 190.

Meanwhile, the control point calculating unit 140 may also use a power control time point Tc instead of the power control point P1. In the case of using the power control time point Tc, a charge time required for charging a required charge power amount is calculated, a time point at which the congested zone enters (or a congested zone entry time point) is calculated, and a time ahead of the congested zone entry time point by the charge time becomes the power control time point Tc. Therefore, the power control time point Tc may correspond to an outcome obtained by converting the power control point P1 to a time.

The charging/discharging controller 150 controls an operation of the charging/discharging unit 160 under the control of the control unit 110, and the charging/discharging unit 160 performs charging or discharging on the main battery 170 or the auxiliary battery 180 under the control of the charging/discharging controller 150.

The main battery 170 provides charged power to a motor to drive the motor, that is, handles driving of the green vehicle 10, and the auxiliary battery 180 handles power supply to an electronic/electric device (i.e., a headlamp, a dome light, or a navigation device) within the green vehicle 10.

The location recognizing unit 190 recognizes the current location of the green vehicle 10 and informs the control unit 110 accordingly. The location recognizing unit 190 may be a GPS device installed in the green vehicle 10, and may be a mobile device of the user having a GPS function.

Meanwhile, the information of the congested zone includes, for example, road identification information (ID), an average driving speed at the corresponding road, a sequence of a point of inflection, a position of a point of inflection, a target arrival speed, a target speed arrival time, and a coasting distance.

The road ID is information for identifying each road, the sequence of a point of inflection is a sequence regarding points at which a speed is changed in a single road, the position of a point of inflection is a position of a point at which a speed of a vehicle is dropped to below a control threshold speed or increased to above the control threshold speed, the target arrival speed is a speed reached after the passage of a point of inflection, and the target speed arrival time is a time taken for reaching a target arrival speed after the passé of the point of inflection, and the coasting distance is a position at which coasting starts to be made with respect to a stop/congested point.

The information of the congested zone may be generated by the congested zone recognizing unit 120 on the basis of traffic information, but it may also be generated and provided by the central server 300.

Meanwhile, the control point calculating unit 140 may be omitted in the power control system 100 in consideration of a load amount of the system. When the control point calculating unit 140 is omitted, the control point calculating unit 140 may be included in the traffic information receiving device 200 or the central server 300. Here, the power control system 100 may request and obtain information regarding a power control time point from the traffic information receiving device 200 or the central server 300

Figure 2:
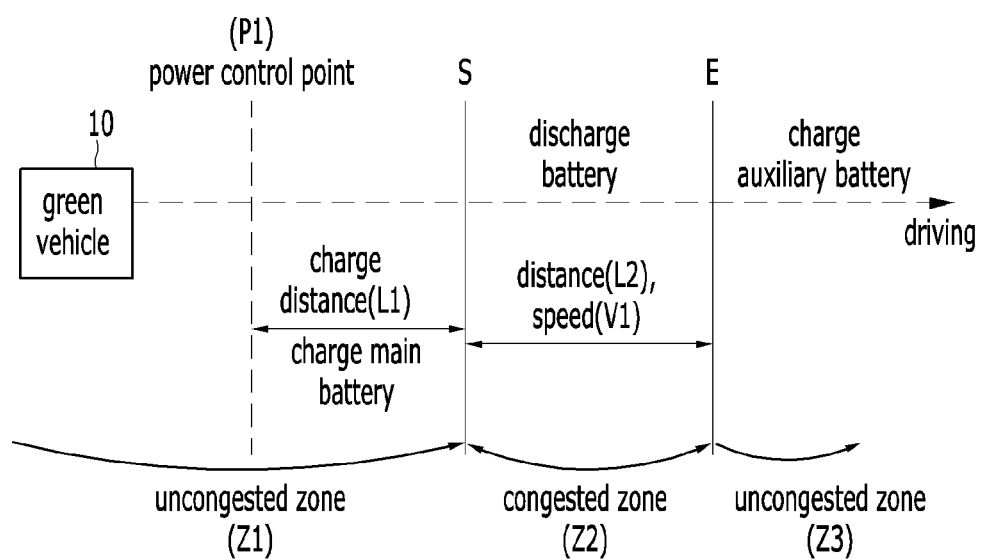
FIG. 2 is a schematic view illustrating power control of a green vehicle according to an exemplary embodiment of the present invention.

Hereinafter, the power control method according to the present invention will be described in relation to a congested zone on a road. FIG. 2 is a schematic view illustrating power control of a green vehicle according to an exemplary embodiment of the present invention.

Referring to FIG. 2, the green vehicle 10, driving at a speed higher than the control threshold speed in an uncongested zone (an uncongested zone) Z1 in which a driving speed is equal to or higher than the control threshold speed), receives traffic information or information of a congested zone at every set period to check whether there is a congested zone Z2 in front of the vehicle.

When the congested zone Z1 is present in front of the green vehicle 10, the green vehicle 10 calculates a power control point P1 at which charging of the auxiliary battery 180 is to be stopped and the main battery 170 is to be concentratedly charged. If the green vehicle 10 is able to sufficiently pass through the congested zone Z1 with the current remaining capacity of the main battery 170, that is, if the current remaining capacity of the main battery 170 is equal to or greater than a required power amount or if an extra power amount has been secured, the green vehicle 10 may not calculate the power control point P1.

However, if the current remaining capacity of the main battery 170 is smaller than the required power amount, the green vehicle 10 recognizes a charge amount (the current remaining capacity) of the main battery 170, calculates a charge amount (that is, a required charge power amount) with which an SOC of the main battery 170 reaches the required power amount, and subsequently sets a start point of the charge distance L1 for securing a required charge power amount, as a power control point P1. Here, preferably, the power control point P1, that is, the charge distance L1, is set such that a power amount greater than the required charge power amount by a preset value or greater is charged just in case.

When the green vehicle 10, while driving, reaches the power control point P1, the green vehicle 10 stops charging the auxiliary battery 180 and concentratedly charges the main battery 170 during the zone of the charge distance L1.

When the green vehicle 10 reaches the start point S of the congested zone Z2, a driving speed thereof is dropped to below the control threshold speed, and accordingly, the main battery 170 starts to be discharged and the green vehicle 10 is driven by power from the main battery 170. Accordingly, the green vehicle 10 drives with power discharged from the main battery 170 during the congested zone Z2 to pass through the congested zone Z2 without charging the main battery 170.

Thereafter, when the green vehicle 10 passes through the end point E of the congested zone Z2 and enters the uncongested zone Z3, the green vehicle 10 accelerates to drive at a high speed and starts to charge the auxiliary battery 180.

Figure 3:
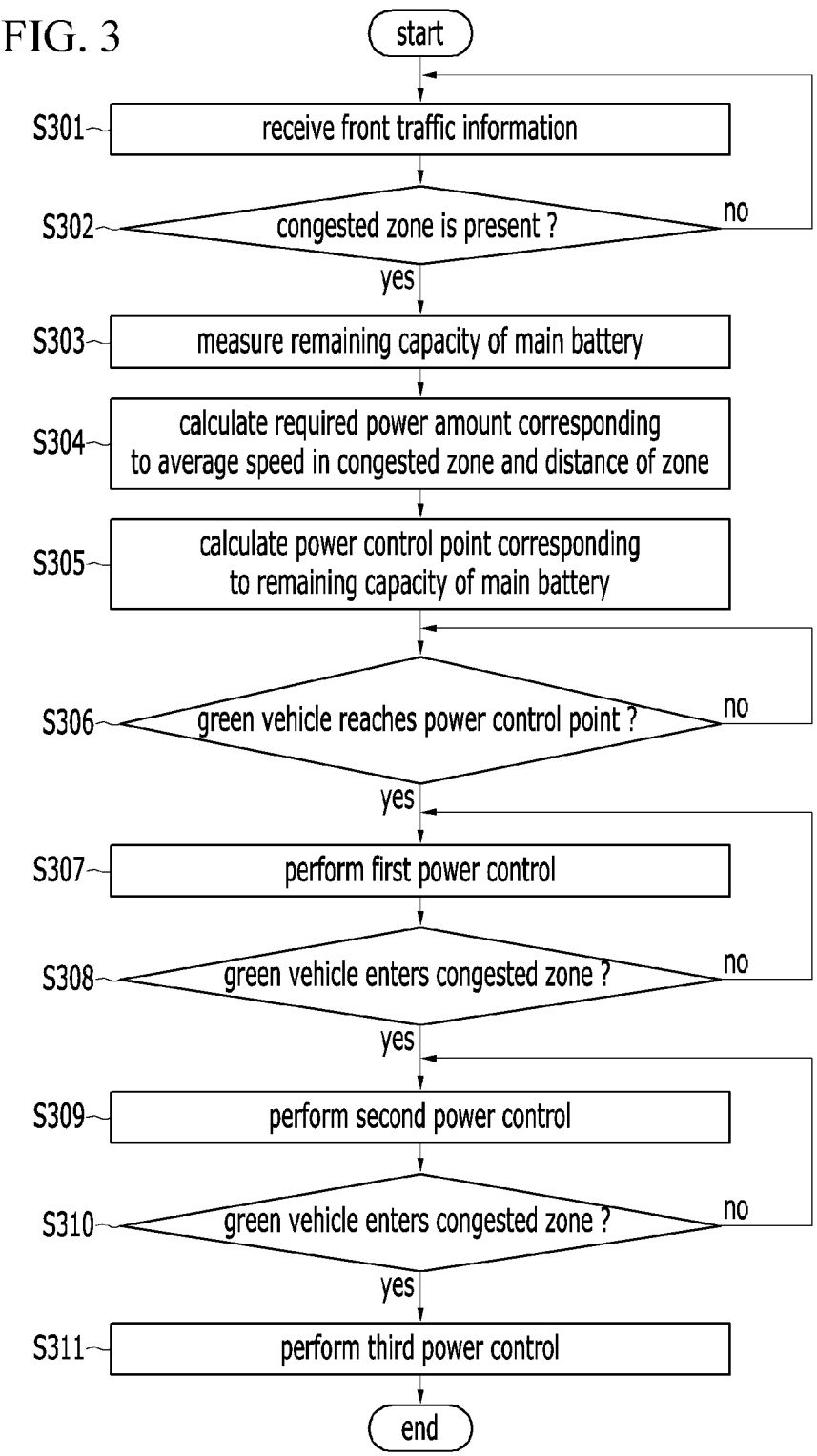
FIG. 3 is a flow chart illustrating a general operation of a power control method for a green vehicle according to an exemplary embodiment of the present invention.

FIG. 3 is a flow chart illustrating a general operation of a power control method for a green vehicle according to an exemplary embodiment of the present invention. Referring to FIG. 3, the control unit 110 of the green vehicle 10 receives traffic information of a front side or information of a congested zone from the traffic information receiving device 200 (S301), and determines whether a congested zone is present on a front side through the congested zone recognizing unit 120 (S302).

When a congested zone is not present on the front side, the control unit 110 enables the green vehicle 10 to continuously drive without controlling power, and when a congested zone is present on the front side, the control unit 110 recognizes a remaining capacity of the main battery 170 through the remaining battery capacity measuring unit 130 (S303), calculates a required power amount through the control time point calculating unit 140 (S304), and subsequently recognizes a required charge power amount corresponding to a difference between the remaining capacity of the main battery 170 and the required power amount and a power control point P1 for the required charge power amount (S305).

The control unit 110 recognizes the current location of the green vehicle 10 through the location recognizing unit 190, and determines whether the current location corresponds to the power control point P1 (i.e., determines whether the green vehicle has reached the power control point P1) (S306). When it is determined that the current location corresponds to the power control point P1 through the location determining process, the control unit 110 performs first power control during the zone from the power control point P1 to the start point S of the congested zone to sufficiently charge the main battery 170 such that the green vehicle 10 may be able to pass through the congested zone with the power of the main battery 170 (S307).

When the current location corresponds to the start point S of the congested zone through recognition of the current location (S308), the control unit performs second power control (S309). Here, the second power control is power control applied to a congested zone in a case in which the congested zone is determined based on an average driving speed.

When the current location corresponds to the end point E of the congested zone through recognition of the current location (S310), that is, when the green vehicle 10 has passed through the congested zone, the control unit 110 performs third power control (S311).

Hereinafter first to third power control will be described.

Figure 4:
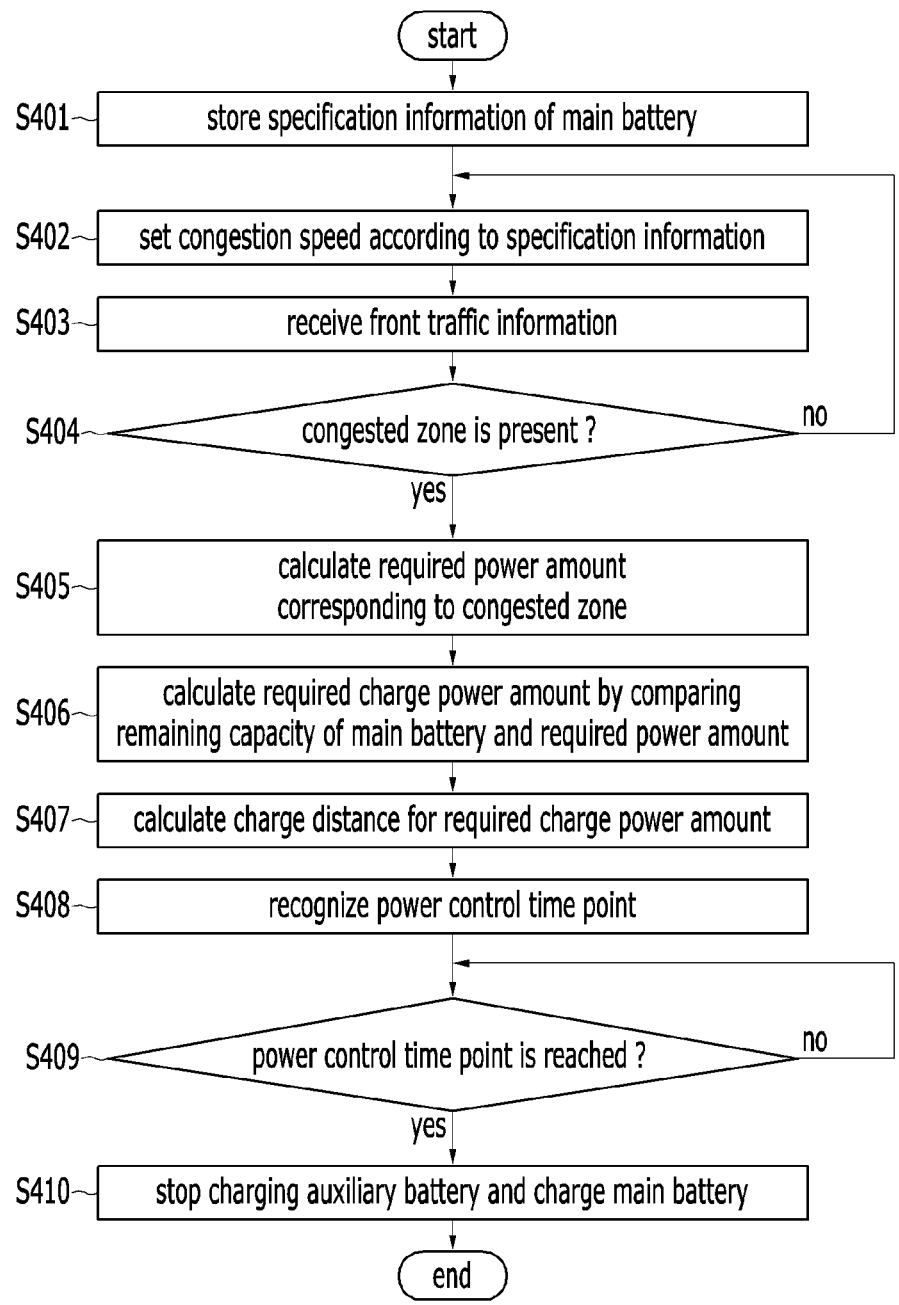
FIG. 4 is a flow chart illustrating a power control method for a green vehicle in an uncongested zone according to an exemplary embodiment of the present invention.

FIG. 4 is a flow chart illustrating a power control method for a green vehicle in an uncongested zone according to an exemplary embodiment of the present invention, in which first power control is illustrated.

Referring to FIG. 4, first, specification information regarding charging and discharging performance of the main battery 170 is stored in the power control system 100 (S401), and a control threshold speed at which charging and driving may be simultaneously performed is set on the basis of the specification information (S402).

In this state, when the control unit 110 receives traffic information regarding a front side (or a front traffic information) (S403), the control unit 110 determines whether a congested zone is present on a front side using the set control threshold speed and the front traffic information (S404).

The control unit 110 recognizes a remaining capacity of the main battery 170 and calculates a required power amount corresponding to the congested zone (S405), calculates a required charge power amount (S406), and subsequently calculates a charge distance L1 (S407) to recognize a power control point P1 (S408).

The control unit 110 determines whether the current location corresponds to the power control point P1 through the location recognizing unit 190 (S409), and when the current location corresponds to the power control point P1, the control unit 110 performs first power control to stop charging the auxiliary battery 180 and concentratedly charge the main battery 170 during a zone from the power control point P1 to the start point S of the congested zone (S410).

That is, during the zone of the charge distance L1, the control unit 110 does not charge the auxiliary battery 180 and performs charging only on the main battery 170.

Figure 5:
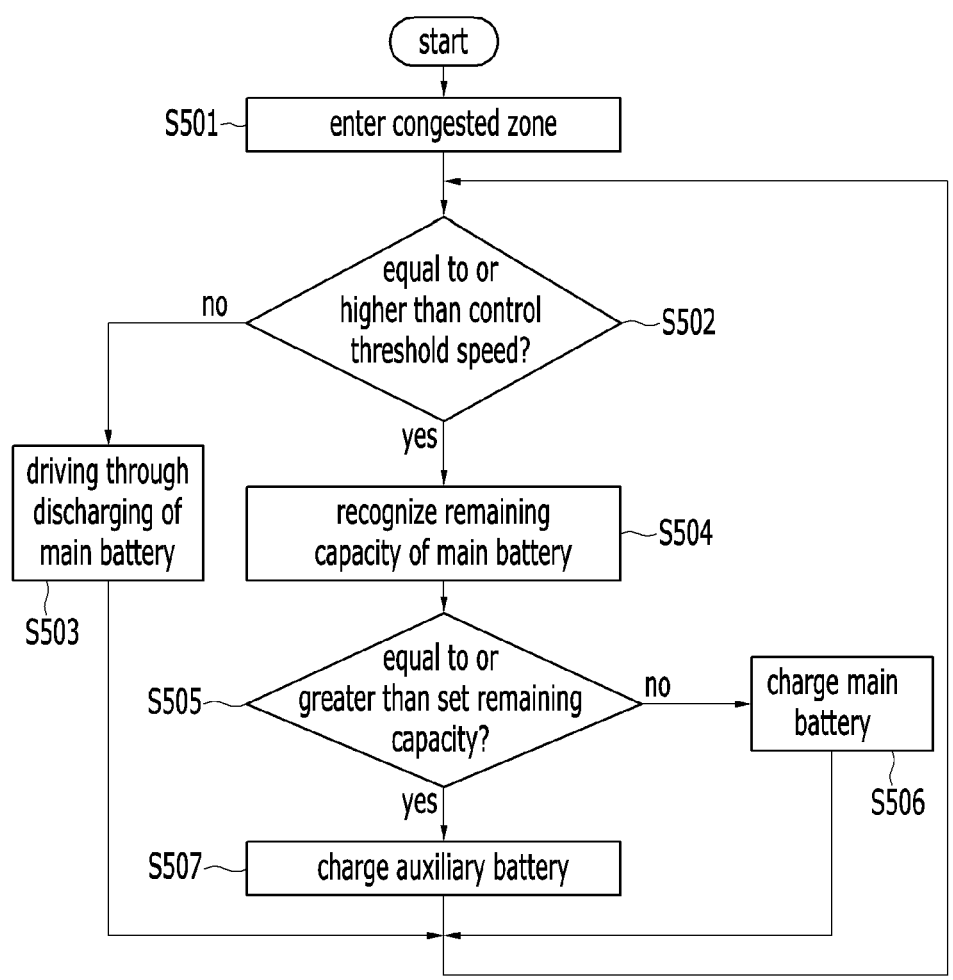
FIG. 5 is a flow chart illustrating a power control method for a green vehicle in a congested zone according to another exemplary embodiment of the present invention.

FIG. 5 is a flow chart illustrating a power control method for a green vehicle in a congested zone according to another exemplary embodiment of the present invention, in which second power control is illustrated.

As illustrated in FIG. 5, when the green vehicle 10 enters the congested zone Z2 (S501), the control unit 110 determines whether the current driving speed of the green vehicle 10 is equal to or higher than a control threshold speed (S502). When the current driving speed of the green vehicle 10 is lower than the control threshold speed, the control unit 110 enables the green vehicle 10 to drive through discharging of the main battery (S503).

When it is determined that the current driving speed of the green vehicle 10 is equal to or higher than the control threshold speed in the determination process (S502), the control unit 110 recognizes a remaining capacity of the main battery 170 (S504) and determines whether the remaining capacity of the main battery 170 is equal to or greater than a set remaining capacity (i.e., required power amount) (S505). The set remaining capacity may be a required power amount or a power amount obtained by adding an extra power amount to the required power amount.

When the remaining capacity (i.e., an SOC) of the main battery 170 is smaller than the set remaining capacity, the control unit 110 charges the main battery 170 (S506), and when the remaining capacity of the main battery 170 is equal to or greater than the set remaining capacity, the control unit 110 charges the auxiliary battery 180 (S507).

For example, in a case in which the required power amount is 70% and the extra power amount is 10% of the required power amount, if the remaining capacity of the main battery 170 is 77% or greater, the control unit 110 charges the auxiliary battery 180, and if the remaining capacity of the main battery 170 is smaller than 77%, the control unit 110 charges the main battery 170.

Meanwhile, in third power control according to an exemplary embodiment of the present invention, that is, in power control in an uncongested zone Z3 after passing through the congested zone, the auxiliary battery 180 starts to be charged, receives traffic information, recognizes whether a congested zone is present on a front side using the received traffic information, and subsequently performs a corresponding operation when the congested zone is present, as in the uncongested zone Z1.

Figure 6:
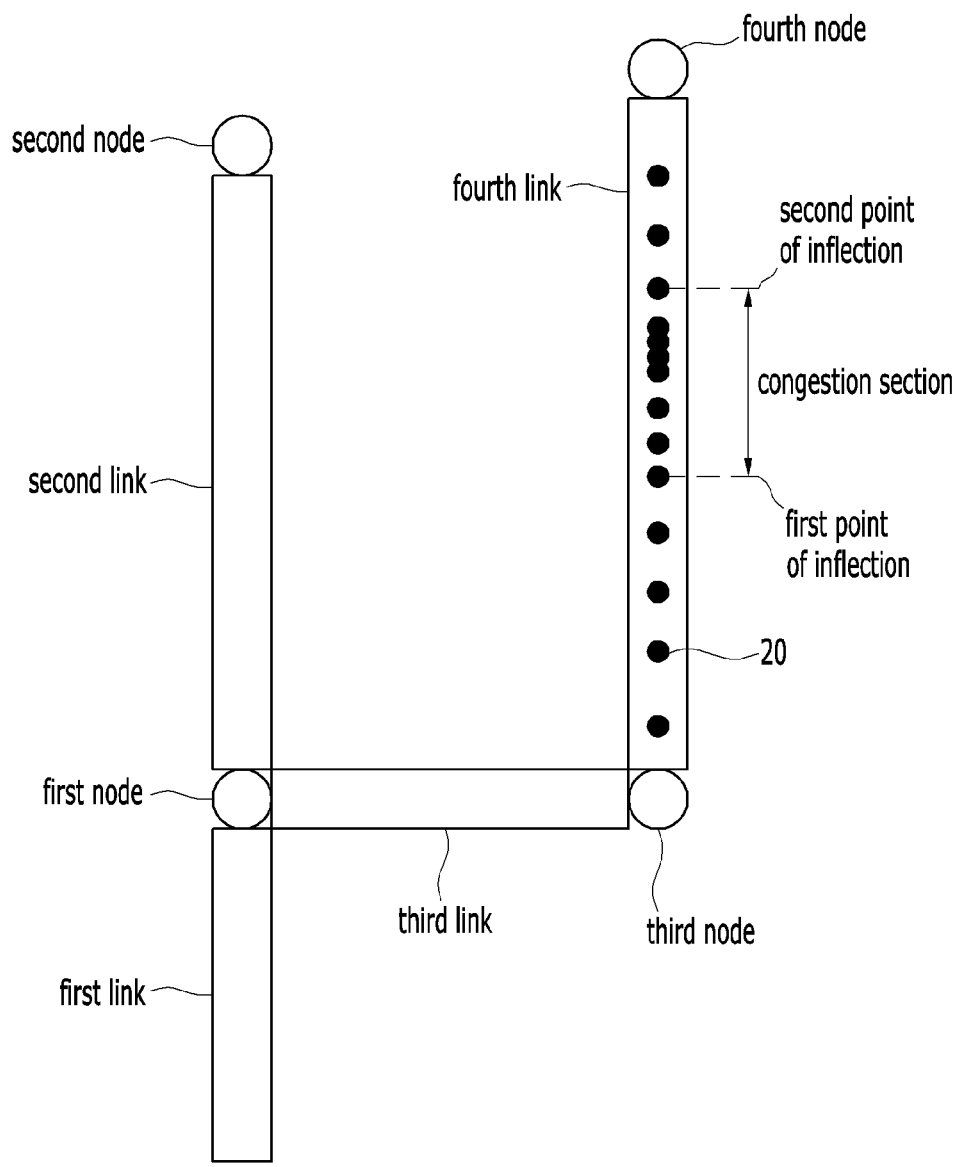
FIG. 6 is a schematic view illustrating a method for recognizing a congested zone according to an exemplary embodiment of the present invention.

FIG. 6 is a schematic view illustrating a method for recognizing a congested zone according to an exemplary embodiment of the present invention. Regarding recognition of a congested zone according to an exemplary embodiment of the present invention, an average driving speed of each link positioned on a front side is recognized, and a link in which an average driving speed is lower than a control threshold speed may be set to a congested zone, or a first point of inflection at which a speed of each vehicle is lower than the control threshold speed and a second point of inflection at which the speed of each vehicle becomes higher than the control threshold speed from the speed lower than the control threshold speed are searched on the basis of GPS information provided from a vehicle positioned ahead and a speed of each vehicle recognized through the GPS information, and a zone between the first and second points of inflection is recognized as a congested zone. That is, the first point of inflection corresponds to the start point S of the congested zone, and the second point of inflection corresponds to the end point E of the congested zone.

The method for recognizing a congested zone on the basis of a point of inflection will be described with reference to FIG. 6. First, a road is expressed by a plurality of nodes and a plurality of links connecting two nodes, and here, each of the links represent a linear or curved road, and each of the nodes is a branch point, for example, a crossroad, or the like, of a road. For example, in FIG. 6, a second link is a road connected to a first node and a second node, and a fourth link is a road connected to a third node and a fourth node. Here, the nodes may not be a branch point of a road but follow a separate classification setting, and in this case, the links may be divided into zones smaller than the links illustrated in FIG. 6.

The control point calculating unit 140, the central server 300, or the traffic information receiving device 200 recognizes a movement trace of each vehicle and a driving speed thereof within a set distance using received front traffic information, that is, GPS information of each vehicle ahead. Also, the control point calculating unit 140, the central server 300, or the traffic information receiving device 200 recognizes a predetermined position at which the driving speed of each vehicle drops from the control threshold speed or higher to below the control threshold speed, as a first point of inflection. Here, in a case in which an average driving speed of a plurality of vehicles is used as a reference, when an average driving speed of a plurality of vehicles is lower than the control threshold speed at a predetermined position, the corresponding predetermined position is recognized as a first point of inflection.

Also, the control point calculating unit 140, the central server 300, or the traffic information receiving device 200 recognizes a movement trace of each vehicle and a driving speed thereof within a set distance using front traffic information (that is, GPS information of each vehicle ahead) after the first point of inflection, and recognizes a predetermined position at which a driving speed of each vehicle is increased from below the control threshold speed to the control threshold speed or higher, as a second point of inflection.

The control point calculating unit 140, the central server 300, or the traffic information receiving device 200 sets the first point of inflection as a start point S of a congested zone, sets the second point of inflection as an end point E of the congested zone, and recognizes a zone between the start point S of the congested zone and the end point E of the congested zone, as a congested zone.

The exemplary embodiments of the present invention have been described in detail. However, the scope of the present invention is not limited thereto and it will be apparent to those skilled in the art that modifications and variations can be made without departing from the spirit and scope of the invention.

What is claimed is:

1. A power control system for a green vehicle configured to receive traffic information via a central server, the power control system comprising:
 a main battery configured to provide charged power to a motor to handle driving of the green vehicle;
 an auxiliary battery configured to handle power supply to an electronic/electric device within the green vehicle;
 a GPS device configured to recognize a current location of the green vehicle;
 a congested zone receiver configured to recognize whether a congested zone is present ahead using the traffic information, and recognize information of the congested zone when the congested zone is present;
 a remaining battery capacity measurement device configured to measure a remaining capacity of each of the main battery and the auxiliary battery;
 a control point calculator configured to calculate a power control point within an uncongested zone using information of the congested zone and the remaining capacity of the main battery when it is recognized by the congested zone receiver that the congested zone is present ahead;
 a main controller configured to generally control each component, recognize the current location of the green vehicle through the GPS device, perform control to charge and discharge the auxiliary battery and the main battery when the green vehicle is currently located in the uncongested zone, perform control to stop charging the auxiliary battery and concentratedly charge the main battery from the power control point to a start point of the congested zone when the green vehicle reaches the power control point, and perform charging on the auxiliary battery when the green vehicle enters the uncongested zone after having passed through the congested zone;
 a charger/discharger configured to perform charging or discharging on the main battery and the auxiliary battery; and
 a charging/discharging controller configured to control an operation of the charger/discharger under the control of the main controller.

2. The power control system of claim 1, wherein:
the congested zone is a zone in which an average driving speed of vehicles is lower than a control threshold speed at which charging the main battery and driving the vehicle are simultaneously performed, or a zone in which driving speeds of vehicles are lower than the lowest speed at which charging the main battery and driving the vehicle are simultaneously performed.

3. The power control system of claim 1, wherein:
the control point calculator calculates a required power amount required for passing through the congested zone using the information of the congested zone, calculates a required charge power amount required to be charged by comparing the remaining capacity of the main battery measured by the remaining battery capacity measurement device with the required power amount, and calculates a charge driving distance required for charging the required charge power amount to calculate the power control point.

4. The power control system of claim 1, wherein:
when the green vehicle reaches the power control point, the main controller controls the green vehicle to have a speed equal to or higher than a set speed.

5. The power control system of claim 1, wherein:
the power control point is replaced with a power control time point so as to be utilized.

6. The power control system of claim 1, wherein:
the congested zone receiver recognizes a first point of inflection at which the speed of the vehicle is dropped to below the control threshold speed, recognizes a second point of inflection at which the speed of the vehicle is changed to be equal to or higher than the control threshold speed, and recognizes a zone from the first point of inflection to the second point of inflection, as the congested zone, on the basis of the traffic information.

7. The power control system of claim 1, wherein:
when the central server or a traffic information receiving device has a function of calculating the power control point using traffic information, the control point calculator is omitted from the components of the power control system.

8. A power control method for a green vehicle, the power control method comprising:
receiving front traffic information;
recognizing whether a congested zone is present ahead using the front traffic information;
when the congested zone is present, recognizing a remaining capacity of a main battery;
calculating a required power amount required for passing through the congested zone, and calculating a required charge power amount corresponding to a difference between the remaining capacity of the main battery and the required power amount and a power control point for the required charge power amount;
when the green vehicle reaches the power control point, stopping charging the auxiliary battery from the power control point to a start point of the congested zone and concentratedly charging the main battery;
when the green vehicle reaches the start point of the congested zone, driving the green vehicle with power of the main battery; and
when the green vehicle reaches an end point of the congested zone, charging an auxiliary battery.

9. The power control method of claim 8, wherein:
the congested zone is a zone in which an average driving speed of vehicles is lower than a control threshold speed at which charging the main battery and driving the green vehicle are simultaneously performed, or a zone in which driving speeds of vehicles are lower than the lowest speed at which charging the main battery and driving the vehicle are simultaneously performed.

10. The power control method of claim 8, wherein:
in the concentrated charging of the main battery, when the green vehicle reaches the power control point, the green vehicle is controlled to have a speed equal to or higher than a set speed.

11. The power control method of claim 8, wherein:
in the recognizing of whether a congested zone is present ahead, a first point of inflection at which the speed of the vehicle is dropped to below the control threshold speed is recognized, a second point of inflection at which the speed of the vehicle is changed to be equal to or higher than the control threshold speed is recognized, and a zone from the first point of inflection to the second point of inflection is recognized as the congested zone, on the basis of the traffic information.

12. The power control method of claim 8, wherein:
the congested zone is a zone in which the average driving speed of the vehicles is lower than the control threshold speed at which charging the main battery and driving the green vehicle are simultaneously performed, and
when the green vehicle enters the congested zone, further comprising:
determining whether a current speed of the green vehicle is equal to or higher than the control threshold speed;
when the current speed of the green vehicle is equal to or higher than the control threshold speed, determining whether the remaining capacity of the main battery is equal to or greater than the required power amount; and
when the remaining capacity of the main battery is equal to or greater than the required power amount, charging the auxiliary battery.

13. A non-transitory computer readable medium containing program instructions executed by a processor, the computer readable medium comprising:
program instructions that receive front traffic information;
program instructions that recognize whether a congested zone is present ahead using the front traffic information;
program instructions that, when the congested zone is present, recognize a remaining capacity of a main battery;
program instructions that calculate a required power amount required for passing through the congested zone, and calculate a required charge power amount corresponding to a difference between the remaining capacity of the main battery and the required power amount and a power control point for the required charge power amount;
program instructions that, when a green vehicle reaches the power control point, stop charging the auxiliary battery from the power control point to a start point of the congested zone and concentratedly charge the main battery;
program instructions that, when the green vehicle reaches the start point of the congested zone, drive the green vehicle with power of the main battery; and
program instructions that, when the green vehicle reaches an end point of the congested zone, charge an auxiliary battery.

* * * * *